United States Patent
Aizawa et al.

(10) Patent No.: US 6,477,497 B1
(45) Date of Patent: Nov. 5, 2002

(54) CONTROL DEVICE AND CONTROL METHOD AS WELL AS STORAGE MEDIUM WHICH STORES PROGRAM WHICH EXECUTES OPERATIONAL PROCESSING OF THE CONTROL DEVICE AND THE CONTROL METHOD

(75) Inventors: Michio Aizawa, Yokohama (JP); Minoru Fujita, Yokohama (JP); Keiichi Sakai, Kawasaki (JP); Yoichi Kazama, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/317,058

(22) Filed: May 24, 1999

(30) Foreign Application Priority Data

May 28, 1998 (JP) .......................................... 10-147556
Apr. 28, 1999 (JP) .......................................... 11-121605

(51) Int. Cl.⁷ .............................................. G10L 21/00
(52) U.S. Cl. ...................................... 704/275; 704/270
(58) Field of Search ................................. 704/270, 275

(56) References Cited

U.S. PATENT DOCUMENTS 5,426,745 A * 6/1995 Baji et al. .................... 395/375
5,737,491 A * 4/1998 Allen et al. .................. 704/270
5,903,870 A * 5/1999 Kaufman ..................... 704/275
6,067,095 A * 5/2000 Danieli ........................ 345/473
6,289,140 B1 * 9/2001 Oliver ......................... 382/313

OTHER PUBLICATIONS

Sharma et al, "Speech/Gesture Interface to a Visual–Computing Environment", 2000 IEEE Computer Graphics and Applications, pp. 29–37.*
Michaud et al, "Speak–n–See", 2000 IEEE, pp. 157–158.*
Philips, "Voice Control of Remote Stereoscopic Systems", 1990 IEEE Proceedings, pp. 594–598.*
Sugeno et al, "Development of an Intelligent Unmanned Helicopter", 1995 IEEE, pp 33–34.*

* cited by examiner

Primary Examiner—Richemond Dorvil
Assistant Examiner—Michael N. Opsasnick
(74) Attorney, Agent, or Firm—Robin, Blecker & Daley (57) ABSTRACT

A control device includes a command table provided with control commands for controlled equipment as a table corresponding to natural language and a control quantity table for determining a control quantity corresponding to a word indicative of a control quantity in the natural language and a kind of control, and generates a control signal for the controlled equipment by applying the inputted natural language to the command table and the control quantity table.

26 Claims, 9 Drawing Sheets

| WORD STRING | COMMAND | KIND |
|---|---|---|
| TOO DARK | OPEN DIAPHRAGM BY "CONTROL QUANTITY" | DIAPHRAGM |
| TOO BRIGHT | CLOSE DIAPHRAGM BY "CONTROL QUANTITY" | DIAPHRAGM |
| RIGHT | ROTATE CAMERA TO RIGHT BY "CONTROL QUANTITY" | ROTATION |
| UPWARD | ROTATE CAMERA UPWARD BY "CONTROL QUANTITY" | ROTATION |
| ENLARGE | INCREASE ZOOM RATIO BY "CONTROL QUANTITY" | ZOOMING |
| --- | --- | --- |

FIG. 3

| WORD STRING \ KIND | DIAPHRAGM | ROTATION | - - - - |
|---|---|---|---|
| SLIGHTLY | 1 STEP | 3 DEGREES | |
| MORE | 2 STEPS | 5 DEGREES | |
| AS MUCH AS POSSIBLE | 3 STEPS | 10 DEGREES | |
| ⋮ | | | |

| WORD STRING | RATIO OF OUTPUT CONTROL QUANTITY TO PRECEDING CONTROL QUANTITY |
|---|---|
| SLIGHTLY | 1/5 TIMES |
| MORE | 1/2 TIMES |
| AS MUCH AS POSSIBLE | ONCE |
| ⋮ | ⋮ |

FIG. 9

CONTROL DEVICE AND CONTROL METHOD AS WELL AS STORAGE MEDIUM WHICH STORES PROGRAM WHICH EXECUTES OPERATIONAL PROCESSING OF THE CONTROL DEVICE AND THE CONTROL METHOD

BACKGROUND OF THE INVENTION

1. Field of the Invention

The present invention relates to a control device and method both of which control controlled equipment such as a surveillance camera by natural language, as well as to a storage medium which stores program software which executes such method.

2. Description of Related Art

Figure 5:
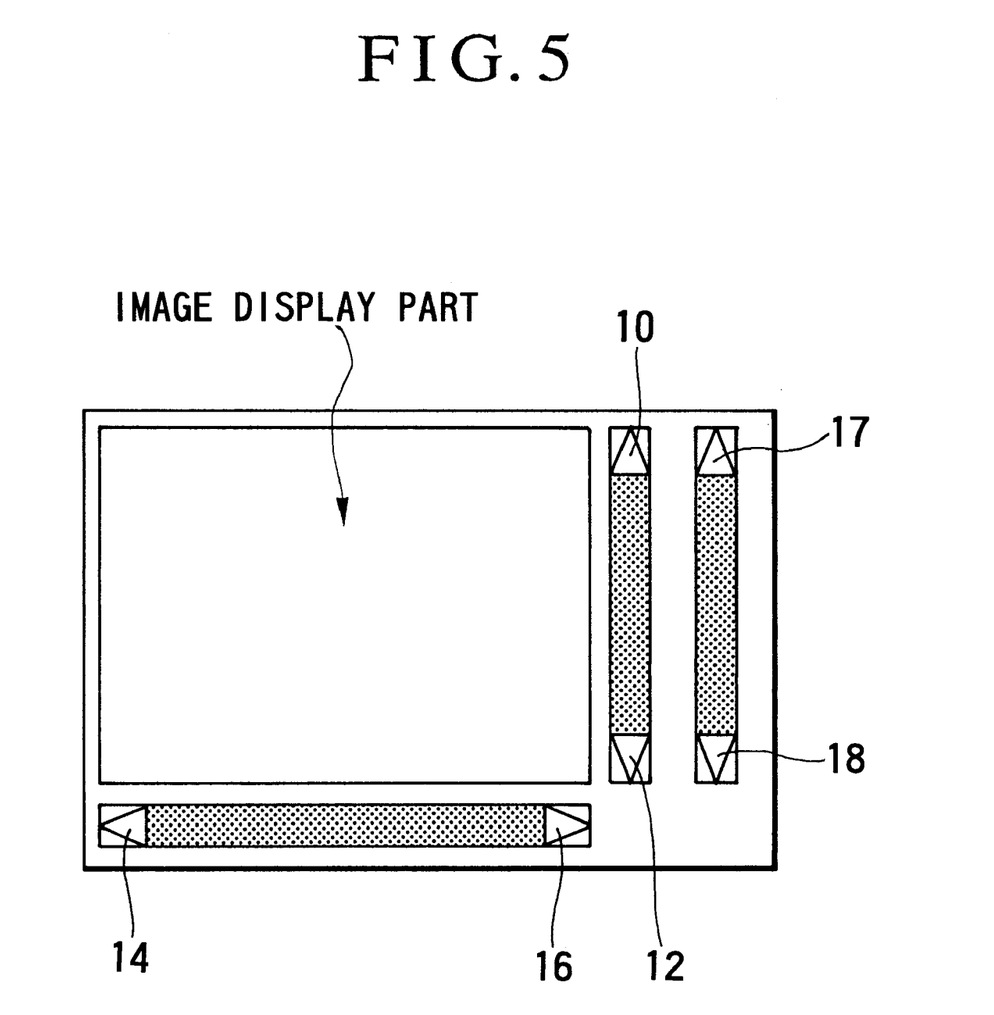
FIG. 5 shows one example of a camera control window disposed on a monitor 25.

Conventionally, if the image pickup direction, the image pickup magnification or the like of a camera installed at a remote location is to be controlled from an information processing terminal via a network, a user executes control while viewing a control window such as that show'n in FIG. 5 displayed on a monitor screen of the information processing terminal.

Specifically, if the user clicks on a slide button 10, the camera is instructed to turn the image pickup direction upward, whereas if the user clicks on a slide button 12, the camera is instructed to turn the image pickup direction downward. If the user clicks on a slide button 14, the camera is instructed to turn the image pickup direction to the left, whereas if the user clicks on a slide button 16, the camera is instructed to turn the image pickup direction to the right. If the user clicks on a slide button 17, the camera is instructed to increase the image pickup magnification, whereas if the user clicks on a slide button 18, the camera is instructed to decrease the image pickup magnification. Incidentally, an image being picked up by the camera is displayed on an image display part of the control window.

However, in the field of conventional control devices such as a control device for controlling a camera at a remote location, there is not an arrangement which performs control using voice nor a control device which interactively controls controlled equipment.

BRIEF SUMMARY OF THE INVENTION

The present invention has been made in view of the above-described problem, and its object is to improve the operability of the above-described conventional type of control device and interactively control controlled equipment such as a camera by using voice.

To achieve the above-described object, according to one aspect of the present invention, there is provided a control device which controls controlled equipment by natural language inputted by input means and which comprises a command table provided with control commands for the controlled equipment as a table corresponding to natural language, a control quantity table for determining a control quantity corresponding to a word indicative of a control quantity in the natural language and a kind of control, and control signal generating means for generating a control signal for the controlled equipment by applying the natural language inputted by the input means to the command table and the control quantity table.

According to another aspect of the present invention, there is provided a control device which controls controlled equipment by inputting natural language by input means and which comprises preceding control quantity holding means for holding a control quantity by which the controlled equipment has been controlled immediately before the natural language is inputted by the input means, a control quantity table for determining a control quantity corresponding to the natural language inputted by the input means on the basis of a word indicative of a control quantity in the natural language and the control quantity held by the preceding control quantity holding means, and control means for computing a control quantity by which to control the controlled equipment, on the basis of the control quantity table, and controlling the controlled equipment.

According to another aspect of the present invention, there is provided a control method of controlling controlled equipment by natural language inputted by an input step, the control method comprising a control command detecting step of detecting a control command having a content corresponding to the natural language, by determining whether a word contained in the natural language inputted by the input step is registered in a command table provided with control commands for the controlled equipment as a table corresponding to natural language, a control quantity determining step of determining whether a word contained in the natural language inputted by the input step is registered in a control quantity table for determining a control quantity corresponding to both a word indicative of a control quantity in the natural language and a, kind of control, and determining whether the natural language contains any expression of control quantity, and, if the natural language contains some expression of control quantity, reading from the control quantity table a control quantity corresponding to a kind of the control command, and a signal generating step of generating a control signal for the controlled equipment on the basis of the control command detected by the control command detecting step and the control quantity determined by the control quantity determining step.

According to another aspect of the present invention, there is provided a control method for a control device which controls controlled equipment by inputting natural language by an input step, which control method comprises a preceding control quantity holding step of holding a control quantity by which the controlled equipment has been controlled immediately before the natural language is inputted by the input step, and a control step of computing a control quantity by which to control the controlled equipment, on the basis of a control quantity table for determining a control quantity corresponding to the natural language inputted by the input step on the basis of a word indicative of a control quantity in the natural language and the control quantity held by the preceding control quantity holding step, and controlling the controlled equipment.

According to another aspect of the present invention, there is provided a storage medium which externally readably stores program software for executing a control method of controlling controlled equipment by natural language inputted by an input step, the control method comprising a control command detecting step of detecting a control command having a content corresponding to the natural language, by determining whether a word contained in the natural language inputted by the input step is registered in a command table provided with control commands for the controlled equipment as a table. corresponding to natural language, a control quantity determining step of determining whether a word contained in the natural language inputted by the input step is registered in a control quantity table for determining a control quantity corresponding to both a word indicative of a control quantity in the natural language and a kind of control, and determining whether the natural language contains any expression of control quantity, and, if the natural language contains some expression of control quantity, reading from the control quantity table a control quantity corresponding to a kind of the control command, and a signal generating step of generating a control signal for the controlled equipment on the basis of the control command detected by the control command detecting step and the control quantity determined by the control quantity determining step.

According to another aspect of the present invention, there is provided a storage medium which externally readably stores program software for controlling controlled equipment by inputting natural language by an input step, the program software executing processing comprising a preceding control quantity holding step of holding a control quantity by which the controlled equipment has been controlled immediately before the natural language is inputted by the input step, and a control step of computing a control quantity by which to control the controlled equipment, on the basis of a control quantity table for determining a control quantity corresponding to the natural language inputted by the input step on the basis of a word indicative of a control quantity in the natural language and the control quantity held by the preceding control quantity holding step, and controlling the controlled equipment.

The above and other objects, features and advantages of the present invention will become apparent from the following detailed description of preferred embodiments of the present invention, taken in conjunction with the accompanying drawings.

DETAILED DESCRIPTION OF THE INVENTION

Preferred embodiments of the present invention will be described below in detail with reference to the accompanying drawings.

Figure 1:
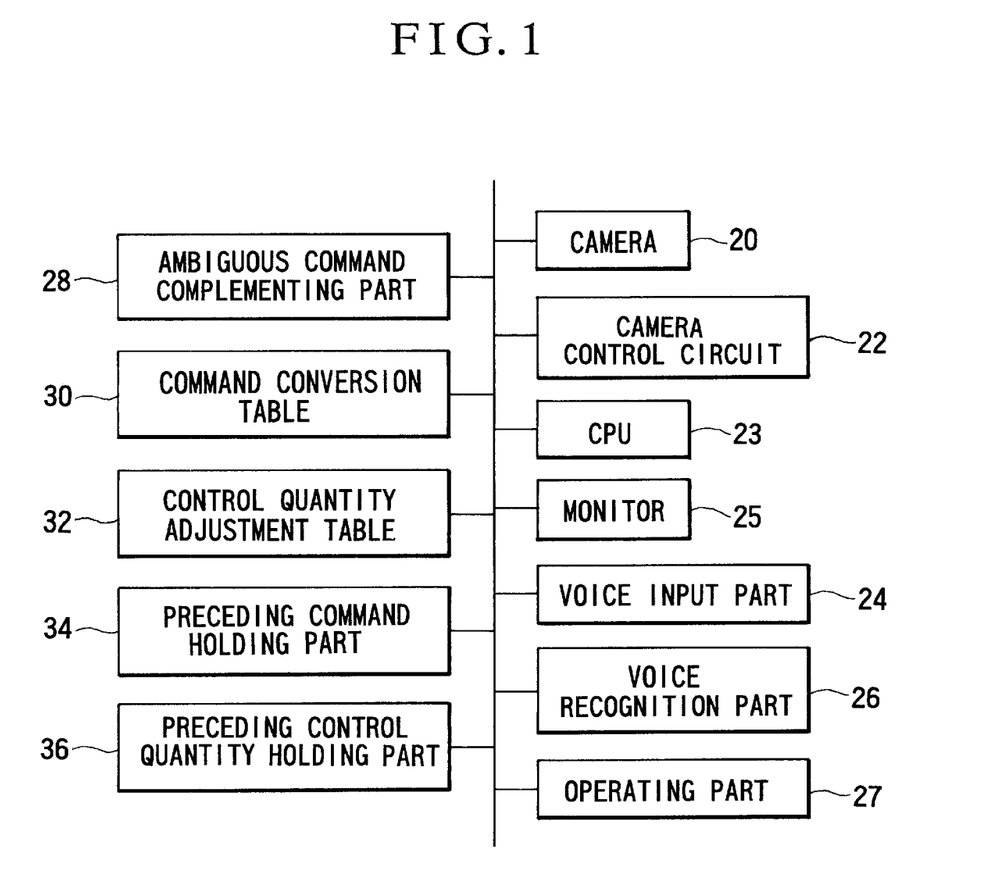
FIG. 1 is a schematic block diagram of the construction of a camera control device according to a first embodiment of the present invention.

FIG. 1 is a schematic block diagram of the construction of a camera control device according to a first embodiment of the present invention. This camera control device is composed of an information processing terminal such as a personal computer.

A camera 20 is externally controllable!in image pickup (panning or tilting) direction, focusing, diaphragm aperture and image pickup magnification. A camera control circuit 22 generates a control command and a status query signal for the camera 20 and applies them to the;camera 20. A CPU 23 exerts control over the entire camera control device. A voice input part 24 is composed of a microphone or the like.

A monitor 25 is composed of a bit map display or the like, and displays a control window similar to that displayed in the related art shown in FIG. 5. A voice recognition part 26 recognizes a voice input from the voice input part 24 and converts the voice input into a word (or words). An operating part 27 is composed of a mouse and/or a keyboard to realize the operation of the control window shown in FIG. 5.

Figure 2:
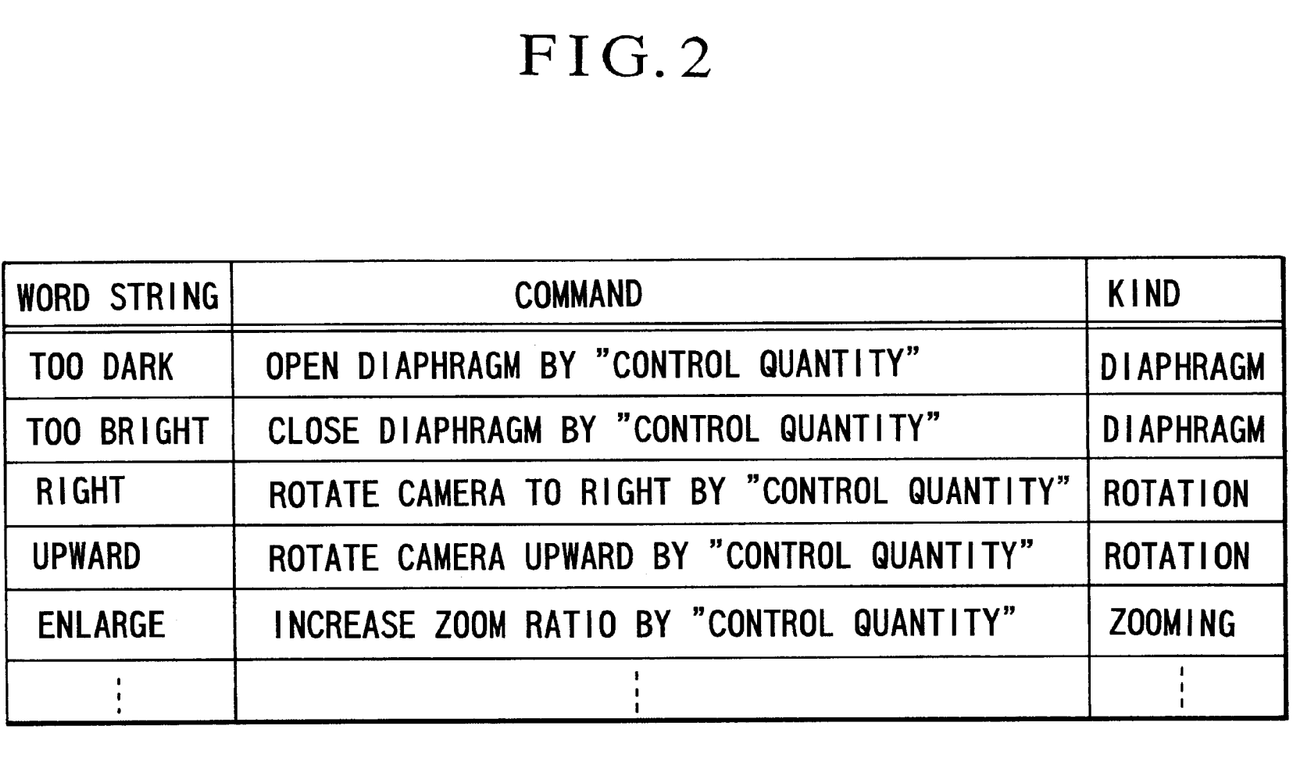
FIG. 2 shows a content example of a command conversion table of the first embodiment.
Figure 3:
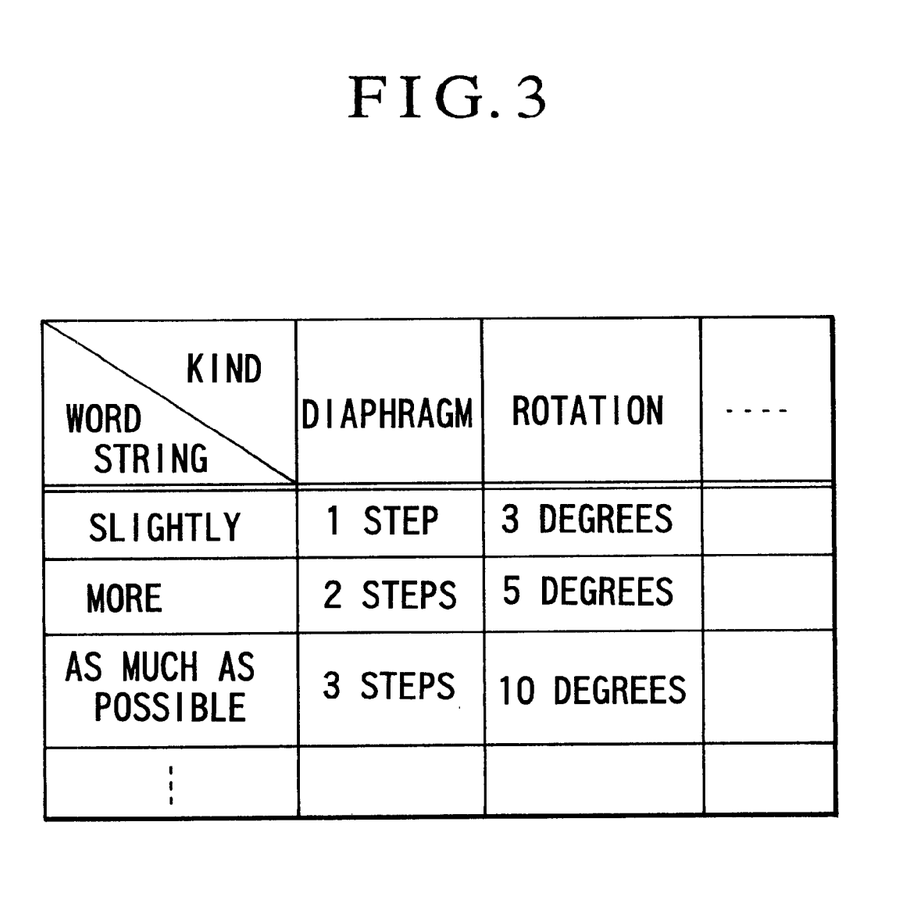
FIG. 3 shows a content example of a control quantity adjustment table of the first embodiment.

An ambiguous command complementing part 28 converts a word (or words) recognized by the voice recognition part 26 into a corresponding camera control command by making reference to the registered contents of a command conversion table 30 such as that shown in FIG. 2. The camera control command is selected from among camera control commands relative to diaphragm aperture, panning or tilting rotation of the camera 20, zoom magnification, and the like, as shown in FIG. 2 by way of example. A control quantity adjustment table 32 is a control quantity adjustment table to which reference is to be made by the ambiguous command complementing part 28 such as that shown in FIG. 3.

A preceding command holding part 34 holds the last command that is generated by the ambiguous command complementing part 28 or the operating part 27 and sent to the camera control circuit 22. A preceding control quantity holding part 36 holds the control quantity of the last command that is generated by the ambiguous command complementing part 28 or the operating part 27 and sent to the camera control circuit 22. The preceding control quantity holding part 36 holds a control quantity corresponding to each individual control command which controls the camera 20. The preceding command holding part 34 and the preceding control quantity holding part 36 are composed of RAMs or the like.

Figure 4:
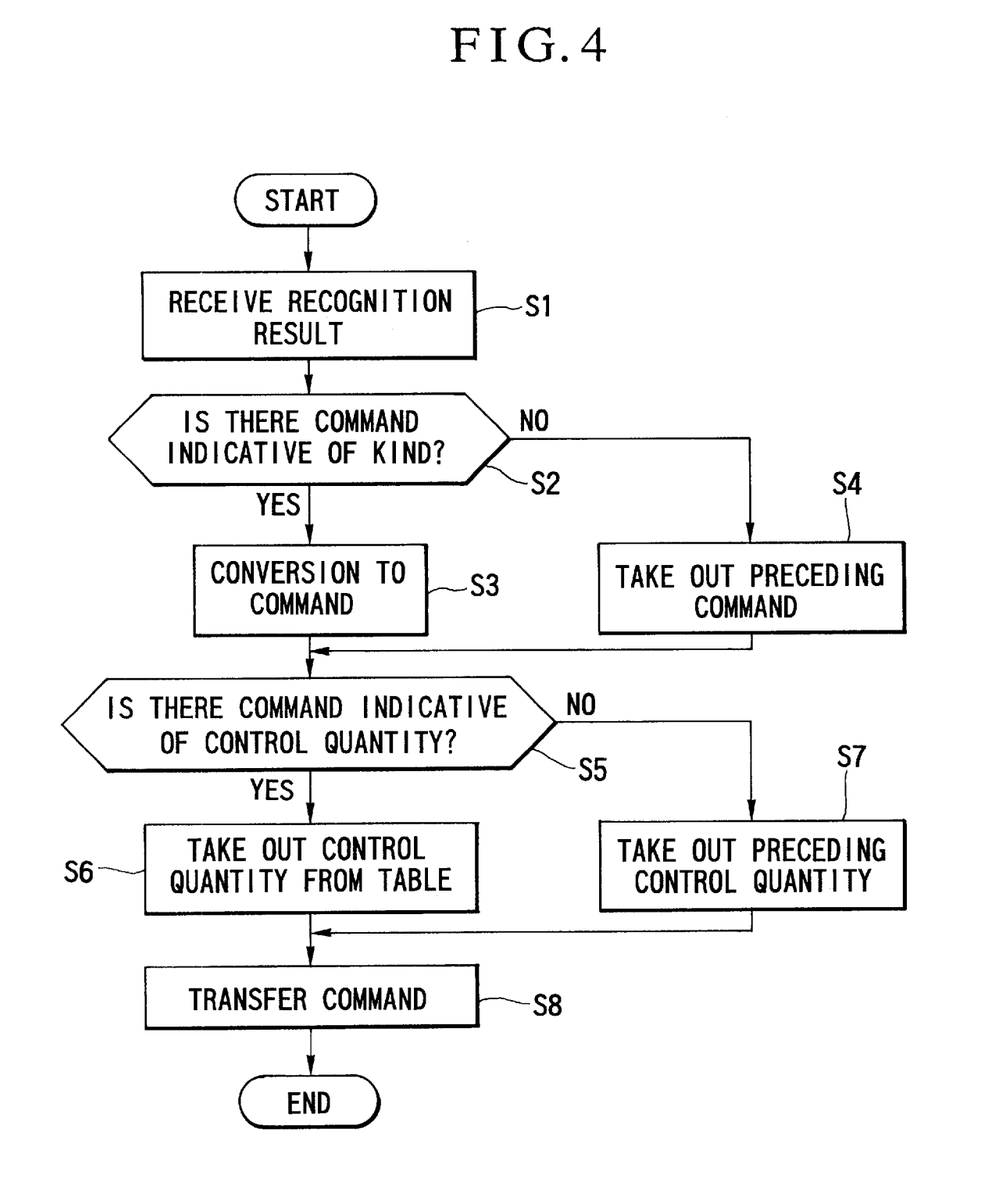
FIG. 4 is a flowchart of a process procedure to be followed by the camera control device according to the first embodiment.

FIG. 4 is a flowchart showing a process procedure to be followed by the camera control device when a voice is inputted in the first embodiment. In the first embodiment, the following operational processing is executed by the CPU 23.

The output of the voice input part 24 is kept under surveillance at all times, and if a user utters any voice, the output of the voice input part 24 is voice-recognized by the voice recognition part 26 and the user's voice is converted into a corresponding word. The ambiguous command complementing part 28 receives the recognition result of the voice recognition part 26 (S1). It is assumed here that the user has uttered "slightly to the right".

Then, the ambiguous command complementing part 28 determines whether a command of the kind which relates to camera control is present in the words from the voice recognition part 26 (S2). Specifically, the ambiguous command complementing part 28 determines whether the words recognized by the voice recognition part 26 or similar words are registered in the command conversion table 30.

If the words recognized by the voice recognition part 26 are registered in the command conversion table 30 (S2), the words are taken out from the comma d conversion table 30 (S3). Specifically, in the case of the utterance example "slightly to the right", since the word "right" is registered in the command conversion table 30, the utterance is understood as a camera control command and the ambiguous command complementing part 28 takes out the command "ROTATE CAMERA TO RIGHT BY CONTROL QUANTITY".

On the other hand, if the words recognized by the voice recognition part 26 are not registered (S2), the command held in the preceding command holding part 34 is taken out as an alternative command (S4). Specifically, in the voice recognition of the voice recognition part 26 results in, for example, only the word "slightly", the command (for example, "right") held in the preceding command holding part 34 is outputted to the camera control circuit 22 for convenience's sake so that a cam era control operation identical to the preceding one is executed.

Then, the ambiguous command complementing part 28 determines whether the words from the voice recognition part 26 have a word contained in the control quantity, adjustment table 32 (S5). In the case of the example "slightly to the right", the word "slightly" is registered in the control quantity adjustment table 32. If the word is found (S5), the word found in Step S5 and the kind of command taken out in Step S3 or S4 are compared with the control quantity adjustment table 32 and a corresponding control quantity is taken out (S6). In the case of the example "slightly to the right", the control quantity is made 3 degrees on the basis of the word "slightly" taken out in Step S5 and the kind of command "ROTATION" taken out in Step S3.

If no control quantity is contained in the result of the voice recognition (S5), the control quantity held in the preceding control quantity holding part 36 is taken out (S7). For example, if the voice recognition of the voice recognition part 26 results in only a word indicative of the kind of command "RIGHT", the camera control circuit 22 performs control by using the control quantity used for the preceding control of the camera control circuit 22. For example, if the camera 20 was previously controlled to rotate to the right by 5 degrees, a control quantity to be used for the present control of the camera control circuit 22 to rotate the camera 20 to the right is also made 5 degrees.

The ambiguous command complementing part 28 combines the command taken out in Step S3 or S4 and the control quantity taken out in Step S6 or S7, and sends the resultant combination control to the camera control circuit 22 (S8). In the case of the voice example "slightly to the right", the ambiguous command complementing pan 28 combines the command "ROTATE CAMERA TO RIGHT BY 'CONTROL QUANTITY'". taken out in Step S3 and the control quantity "3 degrees" taken out in Step S6 and instructs the camera control circuit 22 to execute control having the content of "ROTATE CAMERA TO RIGHT BY 3 DEGREES". At the same time, the ambiguous command complementing part 28 updates the command held in the preceding command holding part 34 with the command "ROTATE CAMERA TO RIGHT BY 'CONTROL QUANTITY'", and updates the control quantity held in the preceding control quantity holding part 36 with the control quantity "3 degrees".

Incidentally, the updating of the command of the preceding command holding part 34 and the updating of the control quantity of the preceding control quantity holding part 36 can also be executed by the operation of the control window shown in FIG. 5, using the operating part 27.

As described above, according to the first embodiment, by inputting voice, it is possible to control the camera. In addition, if at least either one of a command indicative of the kind of control (for example, "right" or "upward") and a command indicative of a control quantity (for example, "slightly" or "more") is recognized, it is possible to control the camera, whereby camera control is enabled with only a simplified word or words closer to ordinary conversation. Incidentally, in the first embodiment, the command indicative of the control quantity is represented as "slightly" or "more", but may also be definitely represented as "3 degrees" or 10 degrees".

In the first embodiment, if the command indicative of the control quantity such as "slightly" or "more" is inputted, a control quantity corresponding to the command is kept constant. A second embodiment which will be described below is arranged to vary a control quantity according to a control quantity by which the camera 20 has previously been controlled. The second embodiment uses the control quantity adjustment table shown in FIG. 8. The construction of a camera control device according to the second embodiment is identical to that of the camera control device according to the first embodiment, and the description thereof is omitted.

Figure 7:
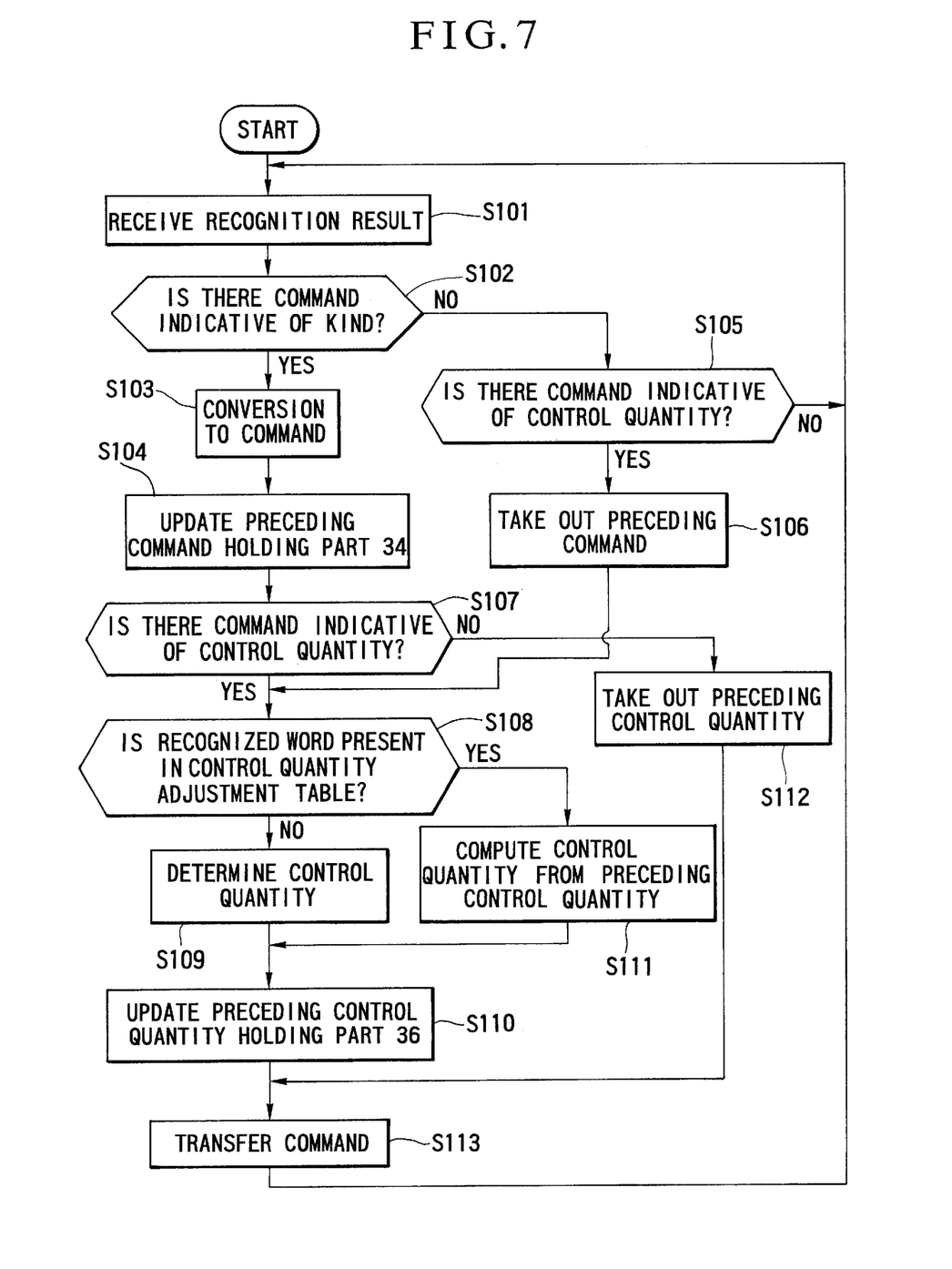
FIG. 7 is a flowchart of a process procedure to be followed by a camera control device according to a second embodiment of the present invention.

FIG. 7 is a flowchart showing a process procedure to be followed by the camera control device when a voice is inputted in the second embodiment. In the second embodiment, the following operational processing is executed by the CPU 23.

The output of the voice input part 24 is kept under surveillance at all times, and if a user utters any voice, the output of the voice input part 24 is voice-recognized by the voice recognition part 26 and the user's voice is converted into a corresponding word. The ambiguous command complementing part 28 receives the recognition result of the voice recognition part 26 (S101).

Then, the ambiguous command complementing part 28 determines whether a command of the kind which relates to camera control (for example, "right") is present 12 in the words from the voice recognition part 26 (S102). Specifically, the ambiguous command complementing part 28 determines whether the words recognized by the voice recognition part 26 or similar words are registered in the command conversion table 30.

If the words recognized by the voice recognition part 26 are registered in the command conversion table 30, the process proceeds to Step S103. In Step S103, the recognized voice is converted into a corresponding kind of camera control command in accordance with the command conversion table 30. Then, the process proceeds to Step S104, in which the camera control command held in the preceding command holding part 34 is updated with the camera control command into which the recognized voice has been converted in Step S103, and the process proceeds to Step S107.

On the other hand, if the words recognized by the voice recognition part 26 in Step S102 are not registered in the command conversion table 30, the process proceeds to Step S105, in which it is determined whether the words have a command indicative of a control quantity. If a command indicative of a control quantity is present, the process proceeds to Step S106, in which the command held in the preceding command holding part 34 is taken out as an alternative command, and the process proceeds to Step S108.

On the other hand, if a command indicative of a control quantity is absent, the process is brought to an end.

In Step S107, the ambiguous command complementing part 28 determines whether the words from the voice recognition part 26 have a word indicative of a control quantity. If a word indicative of a control quantity is present (for example, "slightly" or "10 degrees"), the process proceeds to Step S108.

In Step S108, it is determined whether the recognized word indicative of the control quantity is a word indicative of an ambiguous meaning, present in the control quantity adjustment table 32. If it is determined that the recognized word is a word absent in the control quantity adjustment table 32, the process proceeds to Step S109, in which the recognized word is regarded as a word indicative of a definite control quantity (for example, "10 degrees"), and the control quantity of the word is determined as a command. Then, the process proceeds to Step S110.

On the other hand, if it is determined in Step S108 that the recognized word indicative of the control quantity is a word present in the control quantity adjustment table 32, the process proceeds to Step S111. In Step S111, a computation is performed on an output control quantity corresponding to the control quantity held in the preceding control quantity holding part 36. Specifically, the ratio of an output control quantity by which the camera 20 is to be presently controlled to the control quantity held in the preceding control quantity holding part 36 (a preceding control quantity corresponding to the control command determined in Step S104 or S106) is selected from the control quantity adjustment table 32 on the basis of the recognized word indicative of the control quantity. Then, the output control quantity by which the camera 20 is to be presently controlled is determined by computing the product of "the control quantity held in the preceding control quantity holding part 36" and "the selected ratio". When the control quantity by which the camera 20 is to be presently controlled is determined, the process proceeds to Step S110.

In Step S110, the control quantity held in the preceding control quantity holding part 36 is updated with the control quantity by which the camera 20 is to be presently controlled, and the process proceeds to Step S113.

On the other hand, if the ambiguous command complementing part 28 determines in Step S107 that a word indicative of a control quantity is absent in the words from the voice recognition part 26, the process proceeds to Step S112, in which the control quantity held in the preceding control quantity holding part 36 is taken out without modification as a command indicative of a control quantity by which the camera 20 is to be presently controlled.

In Step S113, the command determined in Step S103 or taken out in Step S106 and the control quantity determined in Step S109 or S111 or taken out in Step S112 are combined and the resultant combination is sent to the camera control circuit 22.

As described above, if an ambiguous word is inputted, a control quantity to be used for the present control of the camera is determined on the basis of the ratio of the control quantity to the preceding control quantity, whereby it is possible to execute camera control which is faithful to an ambiguous word or words close to ordinary conversion.

Figure 8:
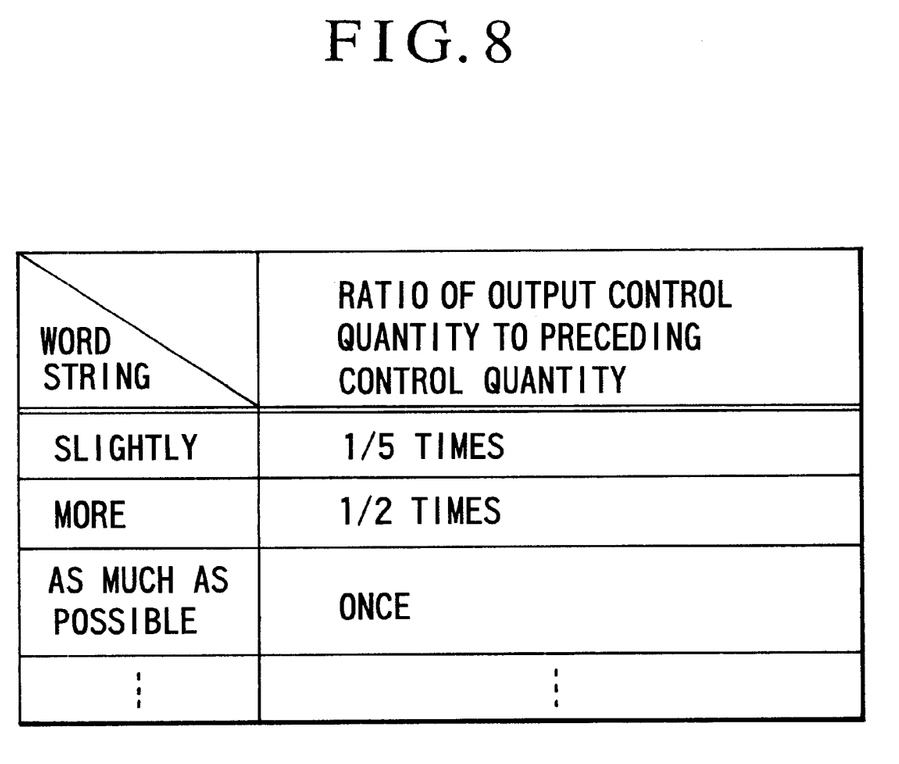
FIG. 8 shows a content example of a control quantity conversion table of each of the second embodiment and a third embodiment of the present invention.

In the second embodiment, if a word indicative of any of the ambiguous control quantities registered in the control quantity adjustment table 32 shown in FIG. 8 is voice-recognized, a control quantity by which the camera is to be presently controlled is determined on the basis of the ratio of the control quantity to the preceding control quantity at any time. In a third embodiment which will be described below, if words indicative of the ambiguous control quantities registered in the control quantity adjustment table 32 shown in FIG. 8 are continuously voice-recognized at the previous and present times, the CPU 23 traces back to the control quantity obtained when a word indicative of a definite control quantity was voice-recognized, and determines a control quantity by which the camera is to be presently controlled on the basis of the ratio of the control quantity to the control quantity obtained when the word indicative of the definite control quantity was voice-recognized (specifically, if the camera 20 is controlled on the basis of the control quantity adjustment table 32, updating of information relative to the control quantity of the preceding control quantity holding part 36 is disabled.) Incidentally, the construction of a camera control device according to the third embodiment is identical to those of the camera control devices according to the first and second embodiments, and the description thereof is omitted herein.

Figure 9:
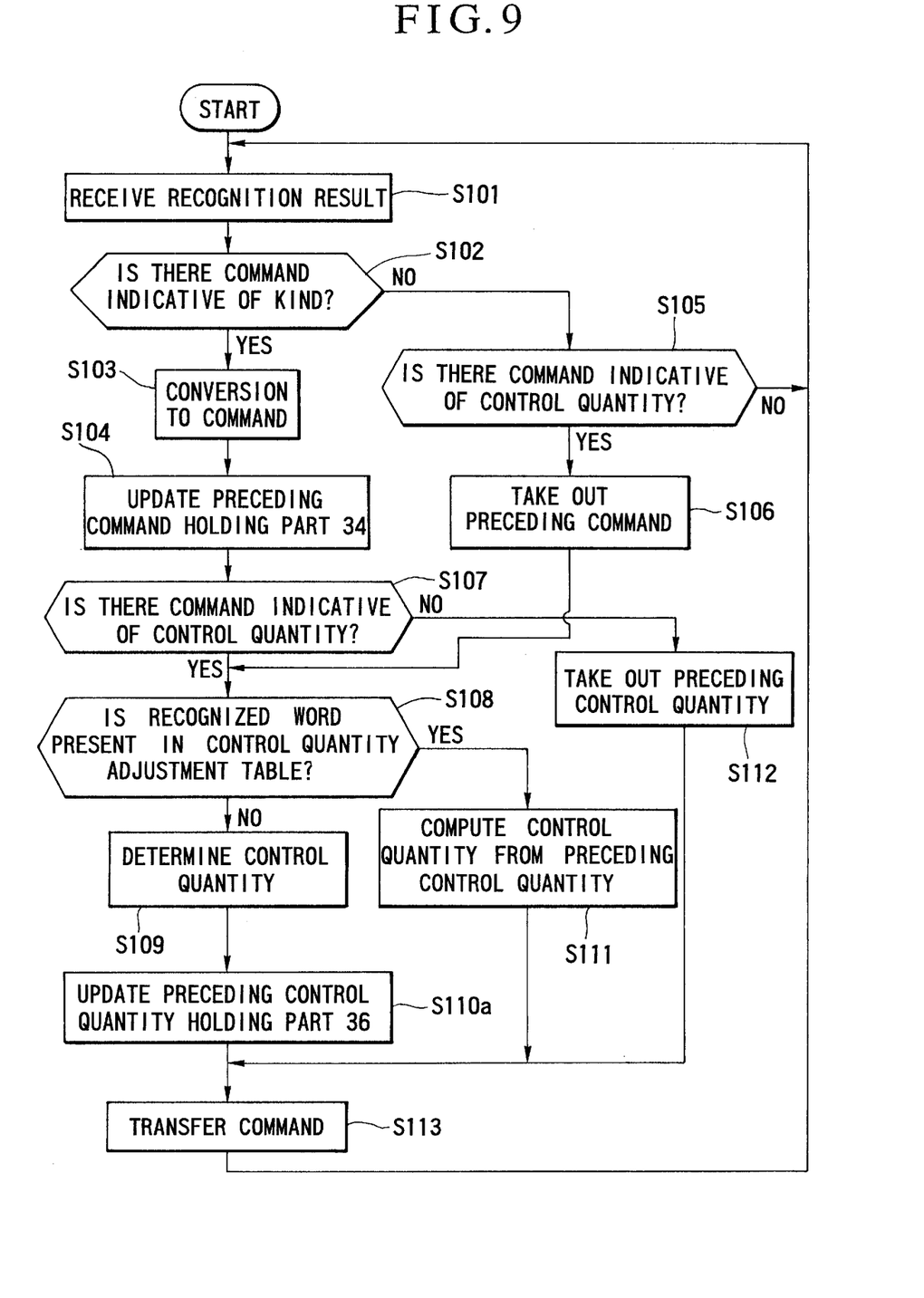
FIG. 9 is a flowchart of a process procedure to be followed by a camera control device according to the third embodiment.

FIG. 9 is a flowchart showing a process procedure to be followed by the camera control device when: a voice is inputted in the third embodiment. In the third embodiment, the following operational processing is executed by the CPU 23 as in the first and second embodiments. In FIG. 9, in steps denoted by reference numerals identical to those used in FIG. 7, since identical processing is performed, the description thereof is omitted herein.

Referring to FIG. 9, if it is determined in Step S108 that the recognized word indicative of the control quantity is not a word indicative of an ambiguous meaning, present in the control quantity adjustment table 32, i.e., the recognized word is a word indicative of a definite control quantity (for example, "10 degrees"), the process proceeds to Step S110a is through Step S109.

In Step S110a, only when it is determined in Step S108 that the recognized word is a word indicative of a definite control quantity, the control quantity held in the preceding command holding part 34 is updated. Specifically, in the operation processing of Step S110a, if words (for example, "slightly") indicative of the ambiguous control quantities registered in the control quantity adjustment table 32 shown in FIG. 8 are continuously inputted, as long as such words are continuously inputted, the CPU 23 traces back to the control quantity obtained when a word indicative of a definite control quantity was voice-recognized, and determines a control quantity by which the camera 20 is to be presently controlled, on the basis of the ratio of the control quantity to the control quantity obtained when the word indicative of the definite control quantity:was voice-recognized. Accordingly, it is possible to execute camera control which is faithful to an ambiguous word or words far closer to ordinary conversion.

In the construction shown in FIG. 1, the voice recognition part 26, the ambiguous command complementing part 28, the command conversion table 30, the control quantity adjustment table 32, the preceding command holding part 34 and the preceding control quantity holding part 36 are arranged within the same control device in which the camera control circuit 22 is installed, but all or part of them may also be installed in a device separate from the camera control circuit 22 and interconnected to each other by a network or wireless lines. An example of such modification is shown in FIG. 6.

Figure 6:
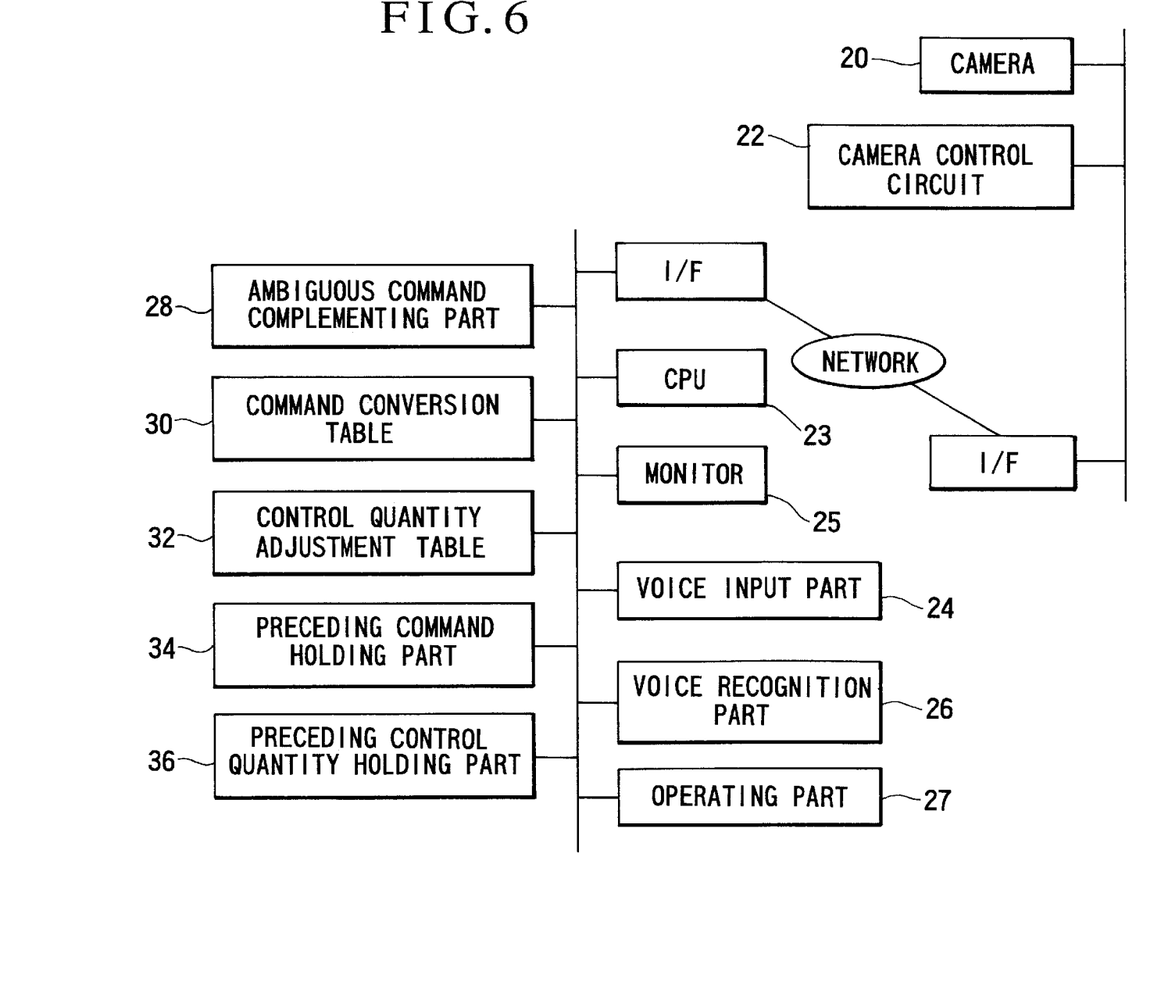
FIG. 6 is a schematic block diagram showing the construction of a modification of the control device according to the first embodiment.

In the construction shown in FIG. 6, the camera 20 and the camera control circuit 22 and the elements 23 to 36 arranged as a camera control device are connected via interfaces (I/F) such as mobile telephones and: a network such as a public network or the Internet. Similarly, only the voice input part 24 may be separated from the other elements so that an input voice is sent to an information processing terminal via a network.

Although the above description of each of the first to third embodiments has referred to a control device which controls a camera, the present invention is not limited to such control device and can also be applied to any kind of controlled equipment such as industrial robots.

Although each of the first to third embodiments uses voice as natural language inputting means, :the keyboard of the operating part 27 may also be used to input natural language.

As is apparent from the foregoing description, in accordance with the present invention, it is possible to smoothly control controlled equipment such as a camera with language expressions used at ordinary conversational levels.

What is claimed is:

1. A control device which controls controlled equipment by natural language inputted by an input device, comprising:
   - a command table for determining a kind of control command for the controlled equipment corresponding to verbal natural language showing a kind of control command;
   - a control quantity table for determining a degree of the determined control to control the controlled equipment corresponding to adverbial input natural language showing a degree of control; and
   - a control signal generating device arranged to generate a control signal for controlling the controlled equipment on the basis of the kind of the determined control command and the degree of the control.

2. A control device according to claim 1, wherein said input device includes a voice input part and a voice recognition part to recognize voice inputted by said voice input part.

3. A control device according to claim 1, wherein said input device is a character input device.

4. A control device according to claim 1, wherein said control signal generating device detects a control command having a content corresponding to the natural language, by determining whether a word contained in the natural language inputted by said input device is registered in said command table; and
   - determines whether the natural language inputted by said input device contains any expression of the degree of the control, by determining whether the natural language is registered in said control quantity table, and, if the natural Language contains some expression of the degree of the control, reading from said control quantity table a control quantity corresponding to a kind of the control command; and
   - generates a control signal for the controlled equipment on the basis of the detected control command and the determined degree of the control quantity.

5. A control device according to claim 4, further comprising a preceding command holding device arranged to hold a control command by which the controlled equipment has been controlled immediately before, and uses a preceding control command held by said preceding command holding device, if an expression indicative of a control command is not contained in the natural language inputted by said input device.

6. A control device according to claim 4, further comprising a preceding control quantity holding device arranged to hold the degree of the control by which the controlled equipment has been controlled immediately before, and uses the preceding degree of the control, if an expression indicative of a control quantity is not contained in the natural language inputted by said input device.

7. A control device according to claim 4, wherein said control signal generating device determines whether the natural language inputted by said input device contains any expression of the degree of the control, by determining whether a word contained in the natural language is registered in said control quantity table, and adopting a predetermined control quantity corresponding to the kind of the control command, if the natural language does not contain any expression of the degree of the control.

8. A control device which controls controlled equipment by inputting natural language by an input device, comprising:
   - a preceding control quantity holding device arranged to hold a control quantity by which the controlled equipment has been controlled immediately before the natural language is inputted by said input device;
   - a control quantity table for determining a control quantity corresponding to the natural language inputted by said input device on the basis of a word indicative of a control quantity in the natural language and the control quantity held by said preceding control quantity holding device; and
   - a control device arranged to compute a control quantity by which to control the controlled equipment, on the basis of said control quantity table, and control the controlled equipment,
   - wherein said control quantity table stores information relative to a ratio of the control quantity held by said preceding control quantity holding device to the control quantity corresponding to the natural language inputted by said input device, according to the word indicative of the control quantity in the natural language.

9. A control device according to claim 8, wherein said preceding control quantity holding device disables updating of the held control quantity if said control device controls the controlled equipment on the basis of said control quantity table.

10. A control device according to claim 8, further comprising:
    - a command table provided with control commands corresponding to the natural language as a table; and
    - a preceding command holding device arranged to bold a control command by which the controlled equipment has been controlled immediately before the natural language is inputted by said input device,
    - wherein said control device executes control of the controlled equipment on the basis of said command table if a word registered in said command table is contained in the natural language inputted by said input device, whereas if a word registered in said command table is not contained in the natural language inputted by said input device, said control device executes control of the controlled equipment on the basis of a preceding command held by said preceding command holding device.

11. A control device according to claim 8, wherein said preceding control quantity holding device holds a preceding control quantity according to each individual control command registered in said command table.

12. A control method for controlling controlled equipment by inputting natural language by an input step, comprising:
    - a preceding control quantity holding step of holding a control quantity by which the controlled equipment has been controlled immediately before the natural language is inputted by said input step; and
    - a control step of computing a control quantity by which to control the controlled equipment, on the basis of a control quantity table for determining a control quantity corresponding to the natural language inputted by said input step on the basis of a word indicative of a control quantity in the natural language and the control quantity held by said preceding control quantity holding step, and controlling the controlled equipment, wherein the control quantity table stores information relative to a ratio of the control quantity held by said preceding control quantity holding step to the control quantity corresponding to the natural language inputted by said input step, according to the word indicative of the control quantity in the natural language.

13. A control method according to claim 12, wherein said preceding control quantity holding step disables updating of the held control quantity if said control step controls the controlled equipment on the basis of the control quantity table.

14. A control method according to claim 12, further comprising a preceding command holding step of holding a control command by which the controlled equipment has been controlled immediately before the natural language is inputted by said input step, wherein said control step executes control of the controlled equipment on the basis of a command table provided with control commands corresponding to the natural language as a table, if a word registered in the command table is contained in the natural language inputted by said input step, whereas if a word registered in the command table is not contained in the natural language inputted by said input step, said control step executes control of the controlled equipment on the basis of a preceding command held by said preceding command holding step.

15. A control method according to claim 12, wherein said preceding control quantity holding step holds a preceding control quantity according to each individual control command registered in the command table.

16. A control method according to claim 12, wherein the controlled equipment is a camera.

17. A storage medium according to claim 12, wherein said program software further comprises a preceding command holding step of holding a control command by which the controlled equipment has been controlled immediately before the natural language is inputted by said input step, said control step executing control of the controlled equipment on the basis of a command table provided with control commands corresponding to natural language as a table, if a word registered in the command table is contained in the natural language inputted by said input step, whereas if a word registered in the command table is not contained in the natural language inputted by said input step, said control step executes control of the controlled equipment on the basis of a preceding command held by said preceding command holding step.

18. A storage medium which externally readably stores program software for controlling controlled equipment by inputting natural language by an input step, said program software executing processing comprising:

a preceding control quantity holding step of holding a control quantity by which the controlled equipment has been controlled immediately before the natural language is inputted by said input step; and a control step of computing a control quantity by which to control the controlled equipment, on the basis of a control quantity table for determining a control quantity corresponding to the natural language inputted by said input step on the basis of a word indicative of a control quantity in the natural language and the control quantity held by said preceding control quantity holding step, and controlling the controlled equipment, wherein the control quantity table stores information relative to a ratio of the control quantity held by said preceding control quantity holding step to the control quantity corresponding to the natural language inputted by said input step, according to the word indicative of the control quantity in the natural language.

19. A storage medium according to claim 18, wherein said preceding control quantity holding step disables updating of the held control quantity if said control step controls the controlled equipment on the basis of the control quantity table.

20. A storage medium according to claim 18, wherein said preceding control quantity holding step holds a preceding control quantity according to each individual control command registered in the command table.

21. A control method for controlling controlled equipment by inputting natural language, comprising:

a determining step of determining a kind of control command to control the controlled equipment corresponding to verbal natural language showing a kind of control command, and determining a degree of the determined control to control the controlled equipment corresponding to adverbial input natural language showing a degree of control; and a signal generating step of generating a control signal to control the controlled equipment on the basis of the determined kind of control command and the degree of the control.

22. A method according the claim 21, wherein the natural language is inputted by a voice input device.

23. A method according to claim 21, wherein the natural language is inputted by a character input device.

24. A storage medium which readably stores program software for controlling controlled equipment by inputting natural language, said program software executing processing comprising:

a determining step of determining a kind of control command to control the controlled equipment corresponding to verbal natural language showing a kind of control command, and determining a degree of the determined control to control the controlled equipment corresponding to adverbial input natural language showing a degree of control; and a signal generating step of generating a control signal to control the controlled equipment on the basis of the determined kind of control command and the degree of the control.

25. A storage medium according to claim 24, wherein the natural language is inputted by a voice input device.

26. A storage medium according to claim 24, wherein the natural language is inputted by a character input device.

* * * * *

UNITED STATES PATENT AND TRADEMARK OFFICE
CERTIFICATE OF CORRECTION

PATENT NO.      : 6,477,497 B1
DATED           : November 5, 2002
INVENTOR(S)     : Michio Aizawa et al.

It is certified that error appears in the above-identified patent and that said Letters Patent is hereby corrected as shown below:

<u>Title page,</u>
Item [54], delete in its entirely and insert -- A CONTROL DEVICE AND METHOD AND A STORAGE MEDIUM WHICH STORES PROGRAM SOFTWARE FOR CONTROLLING CONTROLLED EQUIPMENT EQUIPMENT BY PROCESSING INPUTTED NATURAL LANGUAGE --.

<u>Column 2,</u>
Line 27, delete "a," and insert -- a --.
Line 62, delete "table." and insert -- table --.

<u>Column 4,</u>
Line 6, delete "controllable!" and insert -- controllable --.
Line 10, delete "the;" and insert -- the --.

<u>Column 5,</u>
Line 1, delete "comman d" and insert -- command --.
Lines 7 and 8, delete "CONTROL QUANTITY"." and insert -- 'CONTROL QUANTITY'". --.
Line 17, delete "cam era" and insert -- camera --.

<u>Column 6,</u>
Line 12, delete "10 degrees"." and insert -- "10 degrees". --.
Line 37, after "present" delete "12".

<u>Column 8,</u>
Line 17, delete "when:" and insert -- when --.
Line 63, delete "and:" and insert -- and --.

<u>Column 9,</u>
Line 7, delete ":the" and insert -- the --.
Line 44, delete "Language" and insert -- language --.

UNITED STATES PATENT AND TRADEMARK OFFICE
CERTIFICATE OF CORRECTION

PATENT NO. : 6,477,497 B1
DATED : November 5, 2002
INVENTOR(S) : Michio Aizawa et al.

It is certified that error appears in the above-identified patent and that said Letters Patent is hereby corrected as shown below:

Column 10,
Line 40, delete "bold" and insert -- hold --.

Column 11,
Line 43, before "said control step" indent as new paragraph.

Signed and Sealed this

Twenty-fifth Day of November, 2003

JAMES E. ROGAN
*Director of the United States Patent and Trademark Office*